Patented Jan. 2, 1945

2,366,334

UNITED STATES PATENT OFFICE 2,366,334

PREPARATION OF POWDERED SOAP

Alfred G. Houpt, Springdale, Conn., assignor to American Cyanamid Company, New York, N. Y., a corporation of Maine No Drawing. Application April 30, 1942, Serial No. 441,220

2 Claims. (Cl. 260—97.5)

This invention relates to the preparation of soap powder or the like from talloel or from black liquor soap.

Heretofore the attempts to separate the components of black liquor soap or of talloel have included such methods as high vacuum fractional distillation, crystallization, preferential esterification and combinations of these methods. However, these attempts have been generally unsuccessful. Among the reasons to which this lack of success may be attributed were the poor yields, general lack of sharp separation of acids, corrosion of equipment, manipulation difficulties arising from the nature of the materials treated and the high cost of the methods used. Furthermore, soap products derived from black liquor soap have had only very limited application because of various undesirable properties which have been conferred largely by the presence of rosin soaps and of unsaponifiable fats. These detrimental effects of the rosin content include disagreeable odor, dark color, increase in discoloration on storage, softness of cake soap, non-free-flowing nature of powdered soap, high alkalinity, and hygroscopicity.

As described in application of Christmann and Houpt, Serial No. 212,516, filed June 8, 1938, Patent No. 2,285,902, of which this is a continuation-in-part, it is possible to separate the fatty acids from the rosin acids of black liquor soap by a process which includes forming a hot solution of the rosin acids with salts of fatty acids, in an organic solvent in which the salts are soluble hot but insoluble at room temperatures, and in which the rosin acids are soluble both hot and at room temperatures, cooling the solution to precipitate the salts of the fatty acids, filtering off the precipitated salts and recovering the rosin acids from the solution and the fatty acids from the salts if desired.

As more specifically set forth in Serial No. 212,516, the crude black liquor soap which may be used as the starting material is preferably treated for the removal of various impurities such as lignins and sulphur compounds by dissolving and reprecipitating the soaps from an alkaline salt solution in which the lignin and sulphur compounds remain dissolved. The purified black liquor soap may then be acidified with excess sulphuric acid and the fatty material separated as talloel containing rosin acids as well as fatty acids.

The talloel is dissolved in a suitable solvent, such as secondary amyl alcohol. Either before or after solution, the talloel is partly neutralized with sodium hydroxide or the like in an amount sufficient to combine with the fatty acids as soaps while leaving the rosin acid free. The fatty acid soaps are separated from the solvent solution of free rosin acids by dehydrating the mixture, for example by boiling and refluxing the solvent-water azeotrope over a water trap, until the solution contains less than 1.5% by volume of removable water. Upon cooling the hot, dehydrated mixture, the salts, or soaps, of the fatty acids are precipitated while the rosin acids remain dissolved in the mother liquor.

As an alternative to the foregoing procedure, involving the preparation of talloel by complete acidification of the purified black liquor soap, this soap may be only partly acidified using 50% sulphuric acid or the like in an amount sufficient to liberate the rosin acids while leaving the fatty acids combined as soaps. This partial acidification may be accomplished prior to or after the addition of a suitable organic solvent such as secondary amyl alcohol but in any case the resulting mixture is then dehydrated in the presence of such solvent, by means such as azeotropic distillation, until it contains less than 1.5% by volume of removable water. The resulting hot and substantially dry solution containing both the fat and rosin, along with sufficient alkali to saponify the fatty acids, all dissolved in the organic solvent, may be separated at this point from the undissolved sludge of sodium sulphate and any insoluble non-fatty contaminants such as cellulosic fibers, by known methods, such as decantation or filtration. The fatty acid soaps are separated from the resulting hot organic solvent solution by cooling, whereupon the salts, or soaps, of the fatty acids are precipitated while the rosin acids remain dissolved in the mother liquor, as in the procedure involving the preparation of talloel.

The substantially anhydrous solutions are preferably cooled slowly in a suitable vessel equipped with a very low-speed agitator, such as one of the anchor or gate type, which will scrape the precipitated soap from the cooling surfacess of the container but which will not grind the precipitate. The temperature is allowed to fall uniformly from the dehydrating temperature of about 120° C. to about 20° C. over a period of about 3 to 5 hours. This procedure results in the formation of a coarsely granular precipitate which will filter rapidly. This cooled batch is then blown through a filter press by gas pressure. It should best not be pumped through because the pump agitation may disperse the soap granules and slow up the filtration. An inert gas, such as nitrogen, should preferably be used in this step as well as in all others throughout the process, since exposure of the constituents of black liquor soap to air or oxygen causes rapid oxidation resulting in darkening of the products. A weight of fresh, dry secondary amyl alcohol equal to about the original amyl alcohol charge, is forced through the press after the slurry, to wash the rosin containing liquors from the fatty acid soap cake. In a plate and frame press of the "through washing" design, this proportion of wash liquor is sufficient to reduce the rosin acid concentration to about 1 to 2% in the fatty acids prepared from the filter cake. As the cake in the press retains 50 to 60% of its weight of liquor containing, before washing, about 15% of rosin acids, thorough washing is desirable for a good separation of the fatty acid and rosin acid constituents.

The fatty acid soap filter cake contains about 50 to 60% of secondary amyl alcohol and is charged directly into a vacuum, steam-jacketed, dough mixer with a tail condenser for recovery of the amyl alcohol. The alcohol is distilled under a vacuum of 22 to 25 inches of mercury and at a temperature which does not exceed 80° C. so as to avoid fusion of the charge. Complete removal of the alcohol is accomplished in about 4 to 6 hours. The resultant product is a pale buff-colored, dry, free-flowing, pulverulent, powdered soap. If desired, various extenders such as soda ash can be incorporated with the filter cake prior to or during the distillation of the amyl alcohol. Likewise, water can be worked into the product to give a soap powder having the desired properties. For example, a product containing equal parts of soda ash, water and the pure soap was made directly in the mixer by suitable additions to the fatty acid soap filter cake, and this product was a pale buff, free-flowing, stable soap powder having good solubility and lathering properties.

By carrying out the described procedure, there is obtained a free-flowing, dry, powdered soap sufficiently free from rosin to allow drying without melting, gumming, or sintering. Priod methods of refinement or of separation of the fatty acid fraction of black liquor soap or of talloel have yielded products in the forms of free acids or of esters, and the production of soap required that these materials be resaponified with correspondingly increased costs of plant, operation, and materials. Furthermore, such soap products had the disadvantages cited above as arising from their high contents of rosin soaps and of unsaponifiables. The present method eliminates the resaponification operation, since the soap is produced directly from the separation operation, and it allows control of the content of rosin and unsaponifiables down to very low levels. By drying under vacuum and at temperatures not exceeding 80° C., soap powder is directly produced without further processing.

It will be obvious that other alkalis, acids, solvents, and conditions of operation may be used as set forth in greater detail in application Serial No. 212,516 without affecting the production of the powdered soap. Instead of starting with black liquor soap, I may use talloel, unrefined, refined or semi-refined, to obtain the desired results, and the use of such materials is included in the present process.

Suitable other changes and variations may be made without departing from the spirit and scope of the invention as defined in the appended claims.

I claim:

1. In a process of separating the fatty acid soaps of black liquor soap from the rosin acids by forming a hot, substantially anhydrous solution of fatty acids, rosin acids and an amount of alkali sufficient to neutralize only the fatty acids in an organic solvent in which the alkali soaps of the fatty acids are soluble hot but not cold, and in which the rosin acids are soluble hot and cold, and, after cooling said solution to precipitate the soaps of the fatty acids which are then separated from the mother liquor, the steps which comprise washing the separated soaps with more of the dry organic solvent until the rosin content is sufficiently low to allow drying without melting, gumming and sintering, and drying the fatty acid soaps under vacuum and at a temperature not exceeding 80° C. whereby there is obtained a free-flowing soap-powder.

2. In a process of separating the fatty acid soaps of black liquor soap from the rosin acids by forming a hot, substantially anhydrous solution of fatty acids, rosin acids and an amount of alkali sufficient to neutralize only the fatty acids in secondary amyl alcohol, and, after cooling said solution to precipitate the soaps of the fatty acids which are then separated from the mother liquor, the steps which comprise washing the separated soaps with more of the secondary amyl alcohol until the rosin content is sufficiently low to allow drying without melting, gumming and sintering, and drying the fatty acid soaps under vacuum and at a temperature not exceeding 80° C. whereby there is obtained a free-flowing soap-powder.

ALFRED G. HOUPT.